US010769164B2

(12) United States Patent
Haffner

(10) Patent No.: US 10,769,164 B2
(45) Date of Patent: Sep. 8, 2020

(54) SIMPLIFIED ACCESS FOR CORE BUSINESS WITH ENTERPRISE SEARCH

(71) Applicant: SAP SE, Walldorf (DE)

(72) Inventor: Peter Haffner, St. Leon-Rot (DE)

(73) Assignee: SAP SE, Walldorf (DE)

(*) Notice: Subject to any disclaimer, the term of this patent is extended or adjusted under 35 U.S.C. 154(b) by 233 days.

(21) Appl. No.: 15/833,191

(22) Filed: Dec. 6, 2017

(65) Prior Publication Data
US 2019/0171747 A1 Jun. 6, 2019

(51) Int. Cl.
G06F 16/248 (2019.01)
G06F 16/21 (2019.01)
G06F 16/2457 (2019.01)
G06F 40/205 (2020.01)

(52) U.S. Cl.
CPC ............ G06F 16/248 (2019.01); G06F 16/21 (2019.01); G06F 16/2457 (2019.01); G06F 40/205 (2020.01)

(58) Field of Classification Search
CPC .... G06F 16/248; G06F 16/21; G06F 16/2457; G06F 17/2705; G06F 40/205
USPC ........................................................ 707/722
See application file for complete search history.

(56) References Cited

U.S. PATENT DOCUMENTS

| | | | | |
|---|---|---|---|---|
| 6,006,225 A | * | 12/1999 | Bowman | G06F 16/3325 |
| 6,564,213 B1 | * | 5/2003 | Ortega | G06F 16/3322 |
| 6,775,674 B1 | * | 8/2004 | Agassi | G06F 16/289 |
| 6,963,867 B2 | * | 11/2005 | Ford | G06Q 30/02 |
| | | | | 707/752 |
| 7,467,133 B2 | * | 12/2008 | Subramaniam | G06F 21/6227 |
| 7,925,498 B1 | * | 4/2011 | Baker | G06F 16/3338 |
| | | | | 704/9 |
| 8,024,335 B2 | * | 9/2011 | Anthony | G06F 16/3322 |
| | | | | 707/729 |
| 8,090,754 B2 | * | 1/2012 | Schmidt | G06F 16/284 |
| | | | | 707/726 |

(Continued)

OTHER PUBLICATIONS

Lin, Thomas, et al., "Active Objects: Actions for Entity-Centric Search", WWW 2012—Session: Leveraging User Actions in Search, Lyon, France, Apr. 16-20, 2012, pp. 589-598.*

(Continued)

Primary Examiner — Robert Stevens
(74) Attorney, Agent, or Firm — Buckley, Maschoff & Talwalkar LLC

(57) ABSTRACT

A method and system are provided including a search module; a display; a memory storing processor-executable steps; and a search processor coupled to the memory, and in communication with the mapper module and operative to execute the processor-executable process steps to cause the system to: present a user interface on a display, the user interface including a user-entry field to receive a query, wherein the query includes one or more terms; receive the query in the user-entry field; in response to the received query, parse the query; determine whether any of the one or more terms of the parsed query are object candidates; determine, for each object candidate, one or more available actions for the object candidate; generate a list of one or more selectable objects; and display the list of one or more selectable objects on a user interface. Numerous other aspects are provided.

20 Claims, 7 Drawing Sheets

(56) References Cited

U.S. PATENT DOCUMENTS

| | | | | |
|---|---|---|---|---|
| 8,332,748 B1* | 12/2012 | Karam | ................ | G06F 16/3338 |
| | | | | 715/246 |
| 8,762,360 B2* | 6/2014 | Jiang | ................... | G06F 16/9535 |
| | | | | 707/706 |
| 8,856,163 B2* | 10/2014 | Brin | ...................... | G06F 16/245 |
| | | | | 707/765 |
| 9,032,316 B1* | 5/2015 | Nordstrom | .............. | G06F 3/048 |
| | | | | 715/764 |
| 9,235,654 B1* | 1/2016 | Gupta | ............... | G06F 16/90324 |
| 9,613,132 B2* | 4/2017 | Plakhov | .............. | G06F 16/3328 |
| 2006/0004739 A1* | 1/2006 | Anthony | ............ | G06F 16/3322 |
| 2006/0085392 A1* | 4/2006 | Wang | .................. | G06F 16/9537 |
| 2006/0161520 A1* | 7/2006 | Brewer | ................. | G06F 16/951 |
| 2011/0087686 A1* | 4/2011 | Brewer | .............. | G06F 16/3322 |
| | | | | 707/766 |
| 2012/0095819 A1* | 4/2012 | Li | ......................... | G06Q 30/02 |
| | | | | 705/14.23 |
| 2012/0284105 A1* | 11/2012 | Li | ......................... | G06Q 30/02 |
| | | | | 705/14.23 |

OTHER PUBLICATIONS

Roy, Marcus, et al., "Entity-Centric Search for Enterprise Services", ICSOC 2013, LNCS 8274, Springer-Verlag, Berlin, Germany, © 2013, pp. 404-412.*

Hawking, David, et al., "An enterprise search paradigm based on extended query auto-completion. Do we still need search and navigation?", ADCS '13, Brisbane, QLD, Australia, Dec. 5-6, 2013, pp. 18-25.*

Bast, Holger, et al., "Efficient Interactive Query Expansion with CompleteSearch", CIKM '07, Lisboa, Portugal, Nov. 6-8, 2007, pp. 857-860.*

* cited by examiner

SIMPLIFIED ACCESS FOR CORE BUSINESS WITH ENTERPRISE SEARCH

BACKGROUND

Data plays an important role in the operation of organizations, and may be used across all operational processes. Operational processes may cover different areas of an organization, such as Sales, Project Management, Procurement, etc. Conventionally, each area may use its own self-defined work list specific to that area. As such, it may be difficult for a user associated with one area to access attributes associated with the work list of a different area.

Systems and methods are desired which support efficient selection of attributes for searching and analyzing stored data.

DETAILED DESCRIPTION

Figure 1:
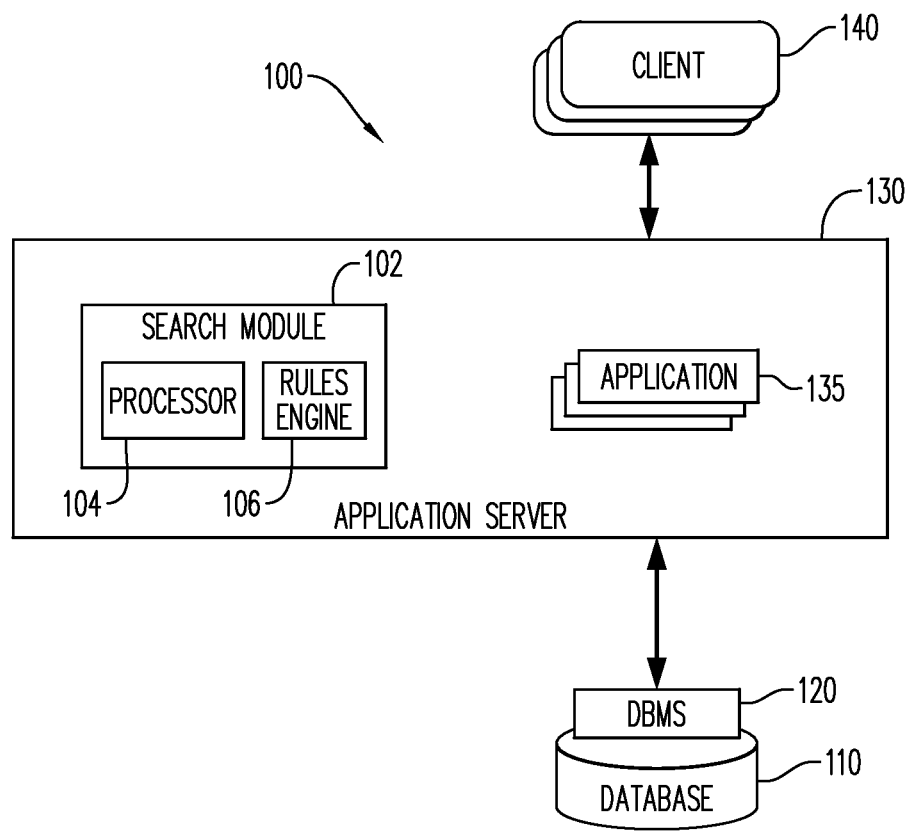
FIG. 1 is a block diagram of a system architecture according to some embodiments.
Figure 2:
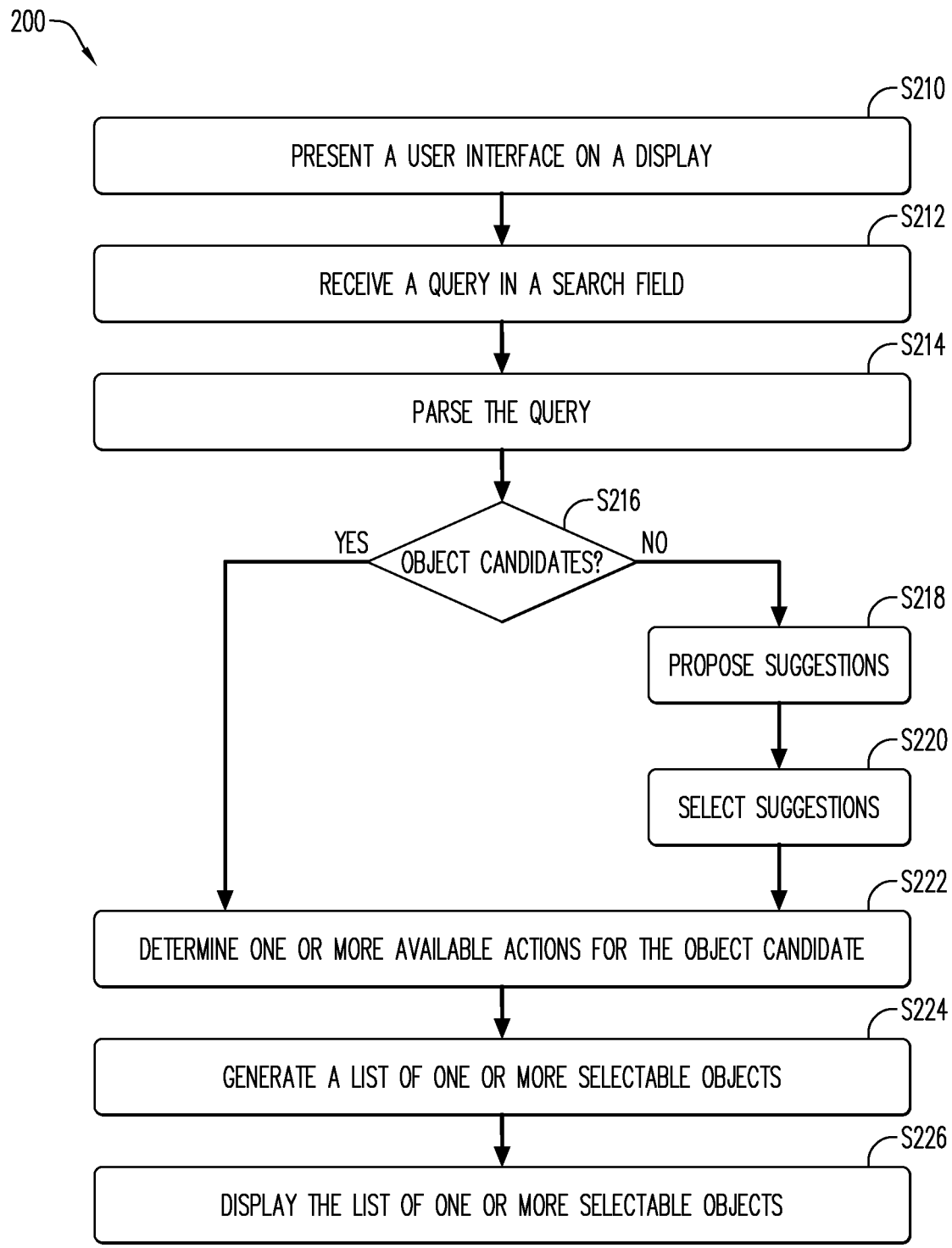
FIG. 2 is a flow diagram of a process according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Conventionally, each area of an organization works with their own self-defined operational work lists (e.g., resulting list of objects based on the request of the business user) for tasks (e.g., reports, analyses, transactions) that relate to specific business questions for that area. For example, in the Procurement area, a work list may relate to "Open Purchase Orders"; while in the Sales area, a work list may relate to "Open Sales Orders." The conventional operational worklists and executable operations may be defined to answer only questions related to that particular area of the organization; may not provide cross application information (e.g., sales data and procurement data in one list); may not provide business object-specific actions depending on the situation/state of the business object.

Conventional work lists may be difficult for someone outside of the area to use, as too many specific attributes may need to be selected for searching to retrieve a desired object. As such, it may be very time consuming to find the desired objects to query. For example, the outside user may have to select the correct operational report and fill in the right search criteria in different fields, and subsequently go into the details of the listed business objects to find out which actions are possible and may be triggered to solve the specific query. This may be a tedious and time-consuming process that may also be prone to user error.

Embodiments may provide for a single unified user interface to receive queries from different areas of an organization for processing. Then, embodiments may provide the appropriate object for the user to work on, including the actions available for that object. In one or more embodiments, only those actions which may be processed may be made available to the user.

In one or more embodiments, a user is presented with a user interface including one user-entry fields to receive a query. A search string encompassing a query may be entered in the user-entry field, and the search may then be executed. The search string may be a free-form text entry. In one or more embodiments, a search module may analyze the search string to determine whether any of the words in the string either identically match an object name or are a synonym match for an object name. Then, for each match, the search module may determine which actions are currently available for that object. The object may be self-aware and provide data related to its current state. Next, a list may be generated and displayed on the user interface including the objects that are the same as, or synonyms to, the object name and include available actions that satisfy the query.

The inventor notes that embodiments provide for different areas to use with the same user interface to cover a large portion (e.g., 80%) of their daily tasks. In one or more embodiments, the user may still have the option to access a specialized work list. Another benefit of embodiments may be that instead of a user entering sophisticated selection criteria in many different fields (i.e., attributes) as with conventional searches, the user may use a single field to search for the desired object and may directly access that object. Embodiments may also provide results that include not only a list of objects, but also the available actions for each object, which may be triggered to further process the object in a correct and optimal way. Conventionally, a user had to access the details of the object to find out the available actions.

A noted benefit of this approach may be that many daily tasks of a user may be executed with a single user interface including limited search fields (e.g., one). The user may generate their own work list, for example, depending on their task, and immediately review the relevant objects to select the correct one that would answer their query.

A benefit of embodiments may be that the user interface with a single field may be easy to use, without requiring special knowledge of the tasks. Another benefit of embodiments may be that personalized most frequent queries may be proposed to the user e.g. to easily process periodical queries.

As used herein, a web browser is a software application for retrieving, presenting and traversing information resources provided by web servers (e.g., the World Wide Web or private networks or file systems). As used herein, a "computing device" may refer to any electronic equipment controlled by a central processing unit, including desktop and laptop computers, smart phones, tablets and any IoT device.

FIG. 1 is a block diagram of system architecture 100 according to some embodiments. Embodiments are not limited to architecture 100 or to a three-tier database architecture.

Architecture 100 includes a search module 102, database 110, database management system (DBMS) 120, application server 130, applications 135 and clients 140. Applications 135 may comprise server-side executable program code (e.g., compiled code, scripts, etc.) executing within application server 130 to receive queries from clients 140 and provide results to clients 140 or other systems/applications (not shown) based on data of database 110 via the search module 102.

The search module 102 may include a processor 104. The processor 104 may, for example, be a conventional microprocessor, and may operate to control the overall functioning of the search module 102. In one or more embodiments, the processor 104 may be programmed to receive queries from the client 140 and generate a list of actionable objects, as described further below.

Database 110 may store data (not shown) used by applications 135. For example, database 110 may store information related to purchase orders (e.g., whether it was delivered, quantity delivered, delivery date, etc.), and sales orders (e.g., order date, order open/closed, quantity, etc.). The inventor notes that while the example provided herein relates to purchase and sales orders, embodiments are applicable to any type of data that may be queried.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Application server 130 may provide any suitable interfaces through which clients 140 may communicate with applications 135, and by extension the search module 102, executing on application server 130. For example, application server 130 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 135 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from, or closely integrated with, DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110 and the search module 102. The application services can be used to expose the database data model, with its tables, hierarchies, views and database procedures to clients. In addition to exposing the data model, application server 130 may host system services such as the search service provided by the search module 102.

Each client 140 may comprise one or more individuals or devices executing program code of a software application for presenting user interfaces to allow interaction with application server 130 and, by extension, the search module 102. Presentation of a user interface as described herein may comprise any degree or type of rendering, depending on the type of user interface code generated by application server 130. As used herein, the terms "client" and "end user" and "user" may be used interchangeably.

For example, a client 140 may execute a Web Browser to request and receive a Web page (e.g., in HTML format) from a website application 135 of application server 130, via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine. A user may then query objects in the database 110 from the web page or user interface to generate the work list.

As used herein, devices, including those associated with the system 100 and any other devices described herein, may exchange information via any communication network which may be one or more of, a Near Field Communication ("NFC") network; a Web Real-Time Communication (RTC) network; a Bluetooth network, and/or an Internet Protocol ("IP") network such as the Internet, an intranet, or an extranet. Note that any devices described herein may communicate via one or more such communication networks.

Figure 3:
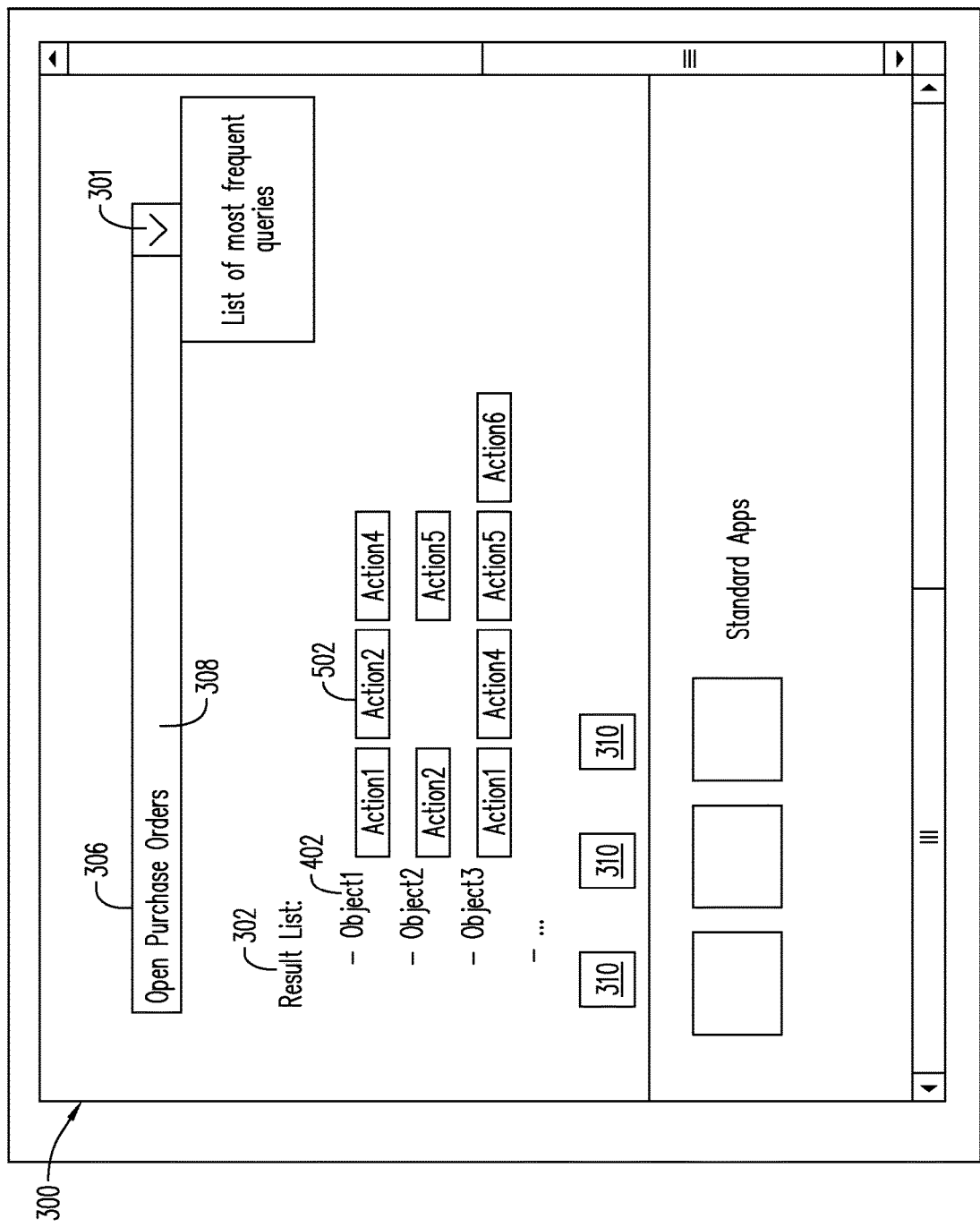
FIG. 3 is an outward view of a graphical interface according to some embodiments.

FIGS. 2-6 include a flow diagram of a process 200 (FIG. 2), a user interface display (FIG. 3) and architecture (FIGS. 4, 5 and 6) according to some embodiments. Process 200 may be executed by the search module 102 according to some embodiments, to provide a user with results and access to the results via the user interface 300 (FIG. 3). In one or more embodiments, the search module 102 may be conditioned to perform the process 200, such that the processor 104/710 (FIG. 7) is a special-purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software. Examples of these processes will be described below with respect to embodiments of the system, but embodiments are not limited thereto. The flow chart(s) described herein do not imply a fixed order to the steps and embodiments of the present invention may be practiced in any order that is practicable.

User interface 300 may be presented on any type of display apparatus (e.g., desktop monitor, smartphone display, tablet display) provided by any type of client device (e.g., desktop system, smartphone, tablet computer). The application which is executed to provide user interface 300 may comprise a Web Browser, a standalone application, or any other application. Embodiments are not limited to the user interface 300 of FIG. 3.

Initially at S210, a user interface 300 is presented on a display 304. The user interface 300 may include one user entry field ("search field") 306 to receive a query 308. In one or more embodiments, the user may formulate the query 308 within this field (e.g., by text, verbal, etc.). While the non-exhaustive examples shown herein include a single user entry field, and this may be the simplest user interface, more than one user entry field may be provided. The inventors note that one or more embodiments may make use of an existing search field 306 on a user interface, that may act as a central entry user interface for any user to process the query for the particular task (e.g. reports/analysis/transactions) and then to generate the worklist. Then in S212, the query 308 is received in the search field 306. In one or more embodiments, the search field 306 may include a drop-down indicator 301, that when selected may provide a list of the most frequent queries. In one or more embodiments, the query may be a semantic string which may be used for searching for objects. In one or more embodiments, the semantic string may include attributes of the object.

Business processes may logically be represented as abstractions referred to herein as a "business object". In one or more embodiments, a business object may be a data structure defined during a design-time. For example, a business object "material" may have fields with attributes such as "Material description", "Material Category", "price", "unit to indicate a quantity, etc. and a "Purchase Order" business object may have, for example, fields with attributes such as "ID" "vendor", "quantity of material", "delivery time frame", etc. that correspond to all of the characteristics of a purchase order used by a business or organization in the generation and managing of purchase orders. A description of the attribute fields may be expressed in metadata associated with the business subject. A business object may also refer to a particular data set as defined by, or according to, the data structure and may be used during a run-time of application making calls to the business object. That is, a business object may refer to an instance (instantiation) of the business object data structure. An example of an instance of a Purchase Order business object may be a purchase order document sent to a business entity having a particular ID number, quantities, time frame for delivery etc.

Turning back to the process, in S214, the search module 102 may receive and parse the query 308. In one or more embodiments, the search module 102 may analyze each of the terms in the query 308 to select terms for further analysis. In one or more embodiments, the search module 102 may include a text interpreter (not shown) to analyze the search string including at least one of terms only and all words in the search string. It is noted that each query may include multiple terms linked to one or more business objects, and the process may be executed for each of them.

After the terms are selected, it is determined in S216 whether any of the selected terms are object candidates for a results list 302. In one or more embodiments, a routine may be executed to determine whether any of the selected terms are object candidates for a results list 302. For example, the routine may compare each of the selected terms to a table 408 (FIG. 4) to determine whether the selected term is the same as one of the attributes for an object. When the selected term is the same as one of the attributes for an object, the selected term may be an object candidate.

Conventionally searches may check the attributes of an object, but often the terms may not really match the attributes directly, or may be part of the attribute value. For example, a search string "not closed purchase orders" will not find purchase orders with status value "open."

In one or more embodiments, even when the selected term is not the same as one of the objects, the selected term may still be an object candidate. For example, when the selected term is a semantical synonym to the object, it may be an object candidate. In one or more embodiments, the search module 102 may execute a rule engine 106 (FIG. 1) to find a possible synonym to identify an object that may fit the query.

Figure 4:
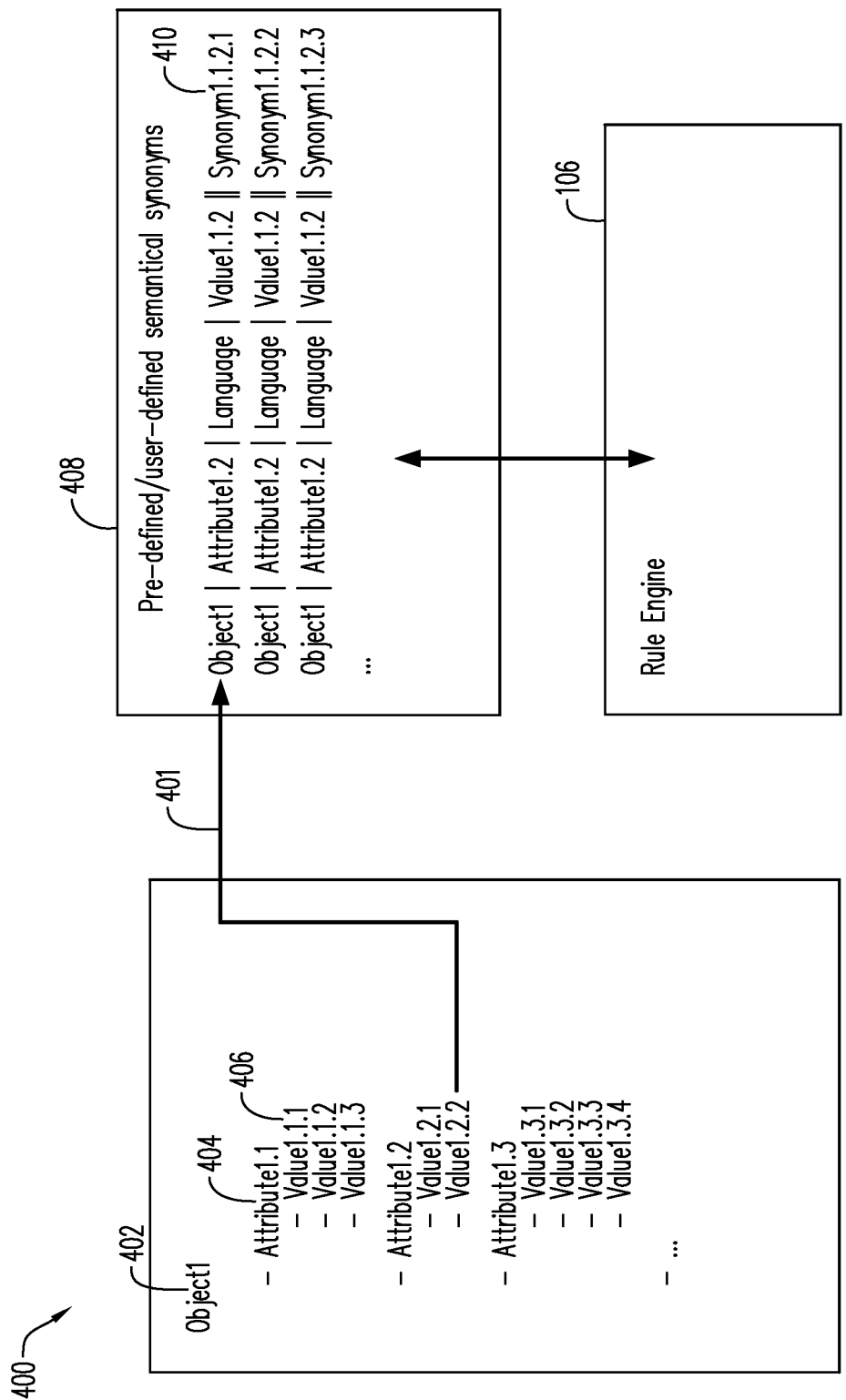
FIG. 4 is a block diagram of a system architecture according to some embodiments.

Turning to FIG. 4, for example, an architectural block diagram 400 of how the synonyms for the objects may be stored in the system is provided. The architecture may include an object 402, pre-defined/user-defined terms and semantical synonyms database 408 ("synonyms table") and the rule engine 106. As described above, the object 402 may be associated with one or more attributes 404, and one or more values 406 may be stored for each attribute. In one or more embodiments, the attributes 404 and the values 406 of the attribute 404 may be linked 401 to synonym entries 410 in the synonyms table 408. The linkage of the synonym entries 410 in the synonym table 408 with the attributes 404 and the value 406 may provide for a user to find the desired object as a result of searching for a synonym. For example, if the value "open" is linked 401 to "not closed" in the synonym table 408, the search for all "not closed" purchase order objects may find the purchase order objects including the value "open". As another example, a search for the attribute "state" or "Situation" may find the objects include attribute "status". A search for the business object "POrder" may find the business object "Purchase Order". In one or more embodiments, a search may be conducted for attributes and business objects. In one or more embodiments, and synonyms for business objects and attributes may also be maintained in the system in the same way as the synonyms for the values of attributes are maintained.

In one or more embodiments, prior to execution of the process, an administrator or other user may load the system with search terms, synonyms for search terms, and links of the terms to different objects. In one or more embodiments, a user may add more synonyms to the system 100 at another point in time.

Turning back to the process 200, if in S216, it is determined the selected term is not an object candidate, the rule engine 106 may, in one or more embodiments, suggest one or more objects to the user in S218. For example, the user may receive a pop-up window or any other suitable notification including one or more possible objects. The user may, in one or more embodiments, select one or more of the suggested objects for further processing in S220. If the user does not select one or more of the suggested objects, the process ends.

When it is determined in S216 that the selected term is an object candidate or when the user selects one or more of the suggested objects in S220, the process proceeds to S222, and the search module 102 determines available actions for each of the object candidates/selected suggested objects (collectively referred to hereinafter as "object candidates").

The inventors note that conventionally, when a user wanted to query an object, the user had to decide before the query was run which actions they wanted to see for the object and fill out a specific field (e.g., "state") and then the system would determine whether that action was available. As such, with conventional searches, it was only possible to search for values that are defined in the search—the search would only look for terms that were included in the query. On the other hand, one or more embodiments provide for the search for a business object without including a state in the query, as the object 402 may report its state when selected as an object candidate.

In one or more embodiments, each business object definition may include a routine 506 (FIG. 5) to determine its current situation/state. In one or more embodiments, the state may be determined from the values of the attributes for the object. The object 402 may determine its own current state as the state depends on the specific process for each object. For example, a Purchase Order object is different from a Sales order, etc., as each object has different attributes. Since each object has different attributes, each object has a different implementation of the route to determine its current state. The routine may be stored centrally on a definition of the Virtual Data Model. In one or more embodiments, the routine may include rules defined via the rule engine 106. In one or more embodiments, the routine may be triggered by the determination that the selected term is an object candidate. In one or more embodiments, the state of one or more objects may be checked at the same, or approximately the same, time or different times. For example, the user may want to know 1. Open sales orders and 2. Open purchase orders, so there may be two objects (sales orders and purchase orders). Within the Sales Orders object, the routine that determines open sales orders may be different from the routine in the Purchase Orders object that determines open purchase orders.

Figure 5:
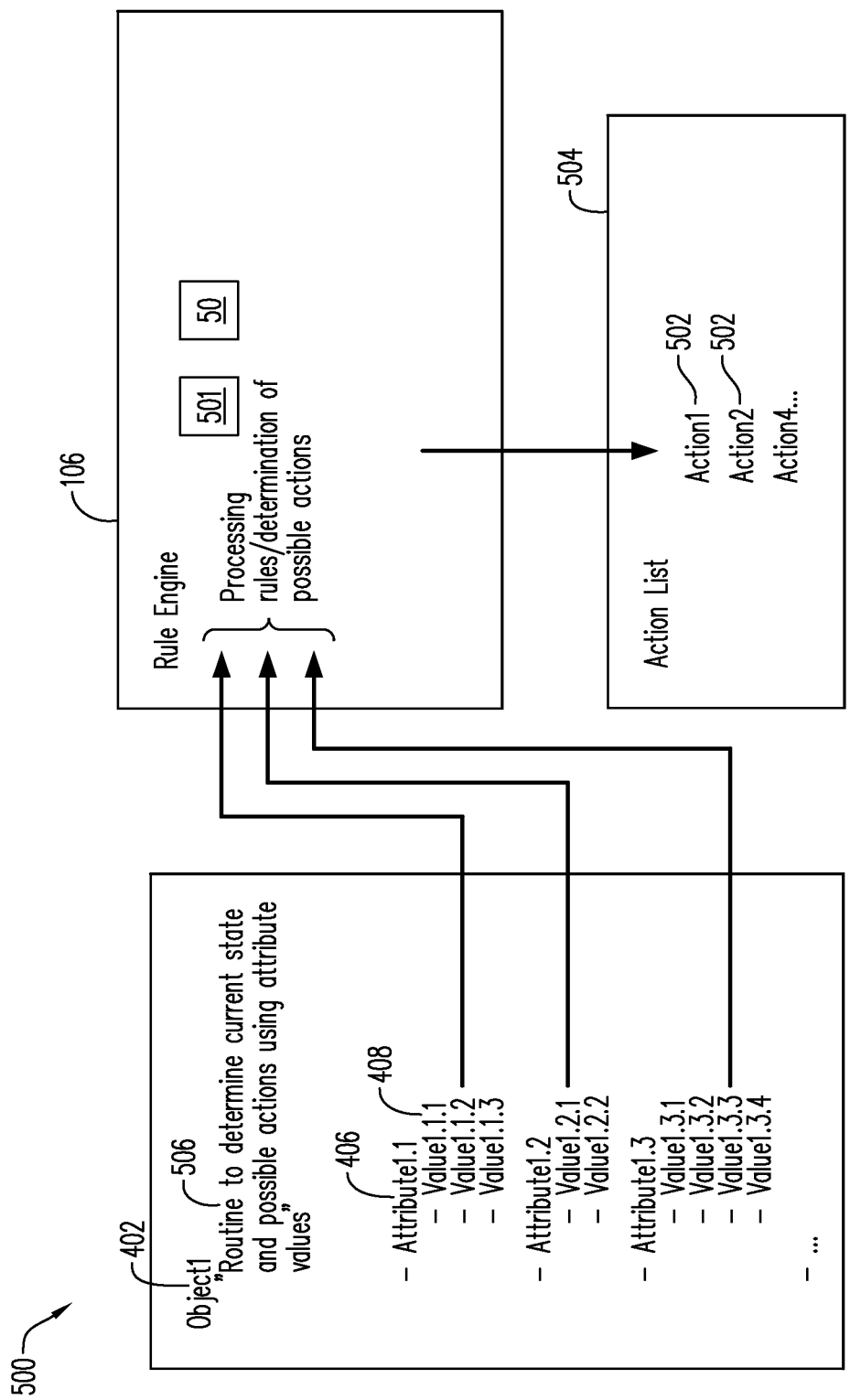
FIG. 5 is a block diagram of a system architecture according to some embodiments.
Figure 6:
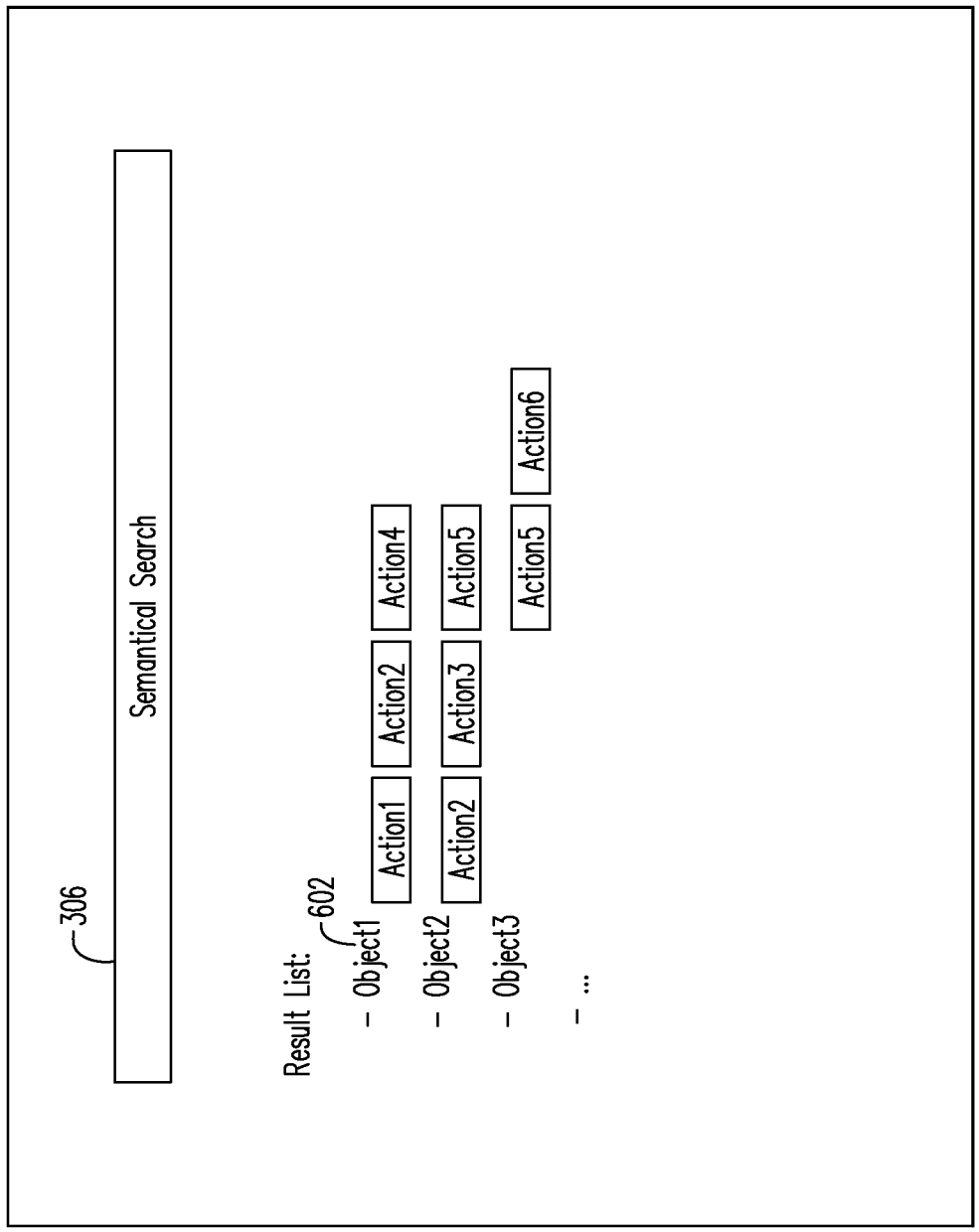
FIG. 6 is a block diagram of a system architecture according to some embodiments.

Turning to FIG. 5 for example, an architectural block diagram 500 of how the object 402 determines its current state is provided. As described above, when the object 402 is selected as an object candidate, a routine specific to the object is executed to determine the object's current state. In one or more embodiments, the routine may also determine possible actions for the object, using attribute values 406. In one or more embodiments, the Rule engine 106 may execute one or more rules 501 to determine which actions 502 are available for each value 406. One or more actions 502 may be available for each value 406. The output of the rules engine 106 may be the provision of an action list 504, including situations and actions which may be processed on the object itself. In one or more embodiments, the action list 504 output of the Rule engine 106 may be provided to the object itself.

It is noted that all actions that may be processed on the object may not be available at the time when the process 200 is executed. For example, in FIG. 6, object1 602 may be associated with action 1, 2, 3 and 4, but action 3 is currently not available. As a more specific example, if the object is a purchase order that has already been delivered, the "create a delivery" action may not be available, and so it may not be included in the list. However, the object knowing that it has been delivered, may include a "create an invoice" action in the list. In one or more embodiments, only the actions that may be processed may be proposed in the list (e.g., the result list described above for the object1 602 only includes actions 1, 2 and 4). It is noted that a benefit of only proposing actions that may be processed may be that a user may not need to decide which action is possible or not, which may be more efficient and prevent errors.

Taking the "Purchase Order" object 402 as an example, for the value 406 of "The purchase order is partly delivered," the following actions 502 may be available: a) "You can enter a goods receipt with reference to this purchase order"; b) "You can enter a supplier invoice with reference to this purchase order"; and c) "You can change this purchase order." As another example, for the value 406 "The purchase order is fully delivered," the following actions 502 may be available: a) "You can set this purchase order to 'finished'"; b) "You can enter a supplier invoice with reference to this purchase order." As yet another example, for the value 406 "The purchase order is to be approved," the following actions 502 may be available: a) "You can approve this purchase order"; and b) "You can change this purchase order".

Turning back to the process 200, after one or more available actions for the object candidate are determined in S222, and received by the search module 102, a list 600 (FIG. 6) of one or more objects is generated in S224. The list 302 is displayed on the user interface 300 in S226. In one or more embodiments, the list 302 may be displayed on the same user interface 300 that received the query 308. The user interface 300 may also include additional selectable elements 310 (FIG. 3) for use in special request situations. For example, an element, app to "Create Purchase Order" or an element/app to "Create Sales Order" and, e.g. "Create" apps in general. The list 302 may include the object 402 and the available actions 502 for that object 402. In one or more embodiments, the user may select one or more of the displayed actions 502 for processing. In one or more embodiments, selection of the one or more displayed actions 502 may directly process the respective process step.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 7:
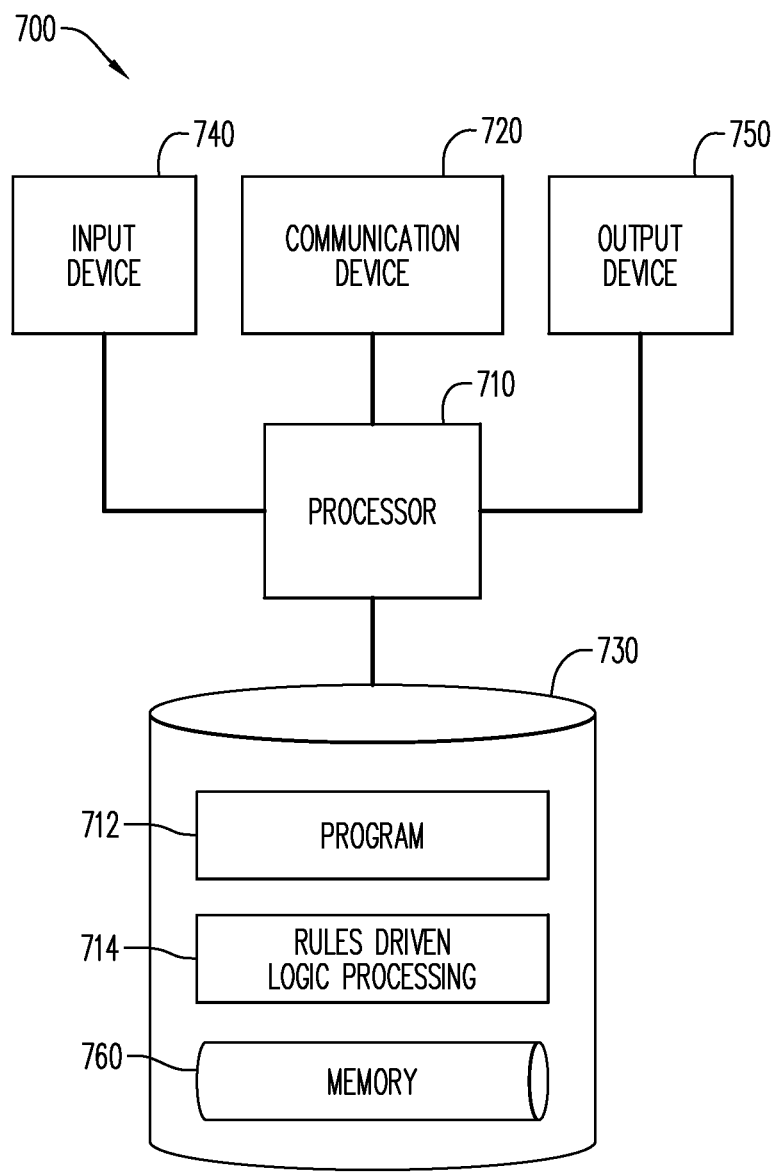
FIG. 7 is a block diagram of a system according to some embodiments.

FIG. 7 is a block diagram of apparatus 700 according to some embodiments. Apparatus 700 may comprise a general- or special-purpose computing apparatus and may execute program code to perform any of the functions described herein. Apparatus 700 may comprise an implementation of one or more elements of system 100. Apparatus 700 may include other unshown elements according to some embodiments.

Apparatus 700 includes search processor 710 operatively coupled to communication device 720, data storage device 730, one or more input devices 740, one or more output devices 750 and memory 760. Communication device 720 may facilitate communication with external devices, such as application server 130. Input device(s) 740 may comprise, for example, a keyboard, a keypad, a mouse or other pointing device, a microphone, knob or a switch, an infrared (IR) port, a docking station, and/or a touch screen. Input device(s) 740 may be used, for example, to manipulate graphical user interfaces and to input information into apparatus 700. Output device(s) 750 may comprise, for example, a display (e.g., a display screen) a speaker, and/or a printer.

Data storage device/memory 730 may comprise any device, including combinations of magnetic storage devices (e.g., magnetic tape, hard disk drives and flash memory), optical storage devices, Read Only Memory (ROM) devices, Random Access Memory (RAM) etc.

The storage device 730 stores a program 712 and/or search platform logic 714 for controlling the processor 710. The processor 710 performs instructions of the programs 712, 714, and thereby operates in accordance with any of the embodiments described herein, including but not limited to process 200.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising
a search module;
a display;
a memory storing processor-executable steps; and
a search processor coupled to the memory, and in communication with the search module and operative to execute the processor-executable process steps to cause the system to:
present a user interface on a display, the user interface including a user-entry field to receive a query, wherein the query includes one or more terms;
receive the query in the user-entry field;
in response to the received query, parse the query;
determine whether any of the one or more terms of the parsed query are object candidates, wherein the determination is made by comparing the one or more terms to a table of terms wherein the term is determined to be an object candidate when the term matches a term in the table of terms or is a semantical synonym of a term in the table of terms;
determine, for each object candidate, based on each object's current state, one or more available actions for the object candidate;
generate a list of one or more selectable objects; and
display the list of one or more selectable objects on a user interface.

2. The system of claim 1, wherein the object candidate maps to the selectable object.

3. The system of claim 1, wherein each semantical synonym is pre-defined prior to receipt of the query.

4. The system of claim 1, further comprising a rule engine to determine one or more available actions for the object candidate.

5. The system of claim 4, wherein the rule engine includes one or more rules for one or more actions associated with each selectable object.

6. The system of claim 1, wherein the selectable object is one of a report, an analysis and an executable operation.

7. The system of claim 1, wherein, when it is determined the one or more terms are not object candidates, the search processor is operative to execute the processor-executable process steps to cause the system to:
suggest, via a rule engine, one or more objects;
receive selection of the one or more suggested objects for further processing.

8. The system of claim 1, wherein the current state of the object is determined from one or more values of one or more attributes for the object.

9. A computer-implemented method comprising:
receiving a query in a user-entry field in a display, wherein the query includes one or more terms;

in response to the received query, parsing the query;
determining whether any of the one or more terms of the parsed query are object candidates by comparing the one or more terms to a table of terms wherein the term is determined to be an object candidate when the term matches a term in the table of terms or is a semantical synonym of a term in the table of terms;
determining, for each object candidate, based on each object's current state, one or more available actions for the object candidate; and
generating a list of one or more selectable objects.

10. The method of claim 9, further comprising:
displaying the list of one or more selectable objects on a user interface.

11. The method of claim 9, further comprising:
mapping the object candidate to the selectable object.

12. The method of claim 11, further comprising:
suggesting one or more objects when it is determined the one or more terms are not object candidates; and
receiving selection of the one or more suggested objects for further processing.

13. The method of claim 9, further comprising:
determining one or more available actions for the object candidate via a rule engine.

14. The method of claim 13, wherein the rule engine includes one or more rules for one or more actions associated with each selectable object.

15. The method of claim 9, wherein the object candidate provides the one or more available actions.

16. The method of claim 9, further comprising:
determining the current state of each object from one or more values of one or more attributes for the object, wherein the current state is determined prior to determining one or more available actions for the object candidate.

17. A non-transitory computer-readable medium storing program code, the program code executable by a computer system to cause the computer system to:
present a user interface on a display, the user interface including a user-entry field to receive a query, wherein the query includes one or more terms;
receive the query in the user-entry field;
in response to the received query, parse the query;
determine whether any of the one or more terms of the parsed query are object candidates, wherein the determination is made by comparing the one or more terms to a table of terms wherein the term is determined to be an object candidate when the term matches a term in the table of terms or is a semantical synonym of a term in the table of terms;
determine, for each object candidate, based on each object's current state, one or more available actions for the object candidate;
generate a list of one or more selectable objects; and
display the list of one or more selectable objects on a user interface.

18. The medium of claim 17, wherein the object candidate maps to the selectable object.

19. The medium of claim 17, further comprising program code executable by a computer system to cause the computer system to:
suggest, via a rule engine, one or more objects, when it is determined the one or more terms are not object candidates;
receive selection of the one or more suggested objects for further processing.

20. The medium of claim 17, wherein the current state of the object is determined from one or more values of one or more attributes for the object.

* * * * *